April 6, 1965  H. L. SHATTO, JR  3,176,645
SHIP POSITIONING APPARATUS
Filed April 25, 1963  2 Sheets-Sheet 1

INVENTOR:
HOWARD L. SHATTO, JR.
BY:
HIS ATTORNEY

April 6, 1965     H. L. SHATTO, JR     3,176,645

SHIP POSITIONING APPARATUS

Filed April 25, 1963     2 Sheets-Sheet 2

INVENTOR:
HOWARD L. SHATTO, JR.
BY:
HIS ATTORNEY

United States Patent Office 3,176,645
Patented Apr. 6, 1965

3,176,645
SHIP POSITIONING APPARATUS
Howard L. Shatto, Jr., Palos Verdes, Calif., assignor to Shell Oil Company, New York, N.Y., a corporation of Delaware
Filed Apr. 25, 1963, Ser. No. 275,685
5 Claims. (Cl. 114—144)

This invention relates to a simplified apparatus for positioning a marine vessel and more particularly to an apparatus adapted to position a floating vessel from which offshore oil wells and the like are drilled.

In a copending application entitled "Ship Control System," by H. L. Shatto, Jr., and J. R. Dozier, Serial No. 95,601 filed March 14, 1961, there is disclosed and claimed a system utilizing a plurality of controllable propulsion means for example outboard type to positioning a drilling vessel over a submerged wellhead. In addition, the system of the copending application also shows and describes a system that determines the position of the vessel with respect to its desired position and then automatically controls both the thrust and the direction of the thrust of the propulsion means to position the vessel. The system described in the copending application preferably uses outboard type of propulsion means for positioning the vessel. The term outboard type propulsion means refers to propulsion units that are provided with a means for rotating a drive housing through 360 degrees to permit directing the propeller thrust in any desired direction. While the system of the copending application is satisfactory and can be adapted to any size of vessel, the cost of the outboard drive means increases in about direct proportion to the size of the means, however, this cost can become very substantial as the vessel size increases.

In addition to the above problem the power required for the outboard drive also increases when the vessel must be positioned against large forces as for example in an area where large currents are present due to tides and the like. Furthermore, the power required for the outboard drive is increased in those cases where the outboard drive is relied upon as the main propulsion force for moving the vessel.

Accordingly, the principal object of this invention is to provide an economical propulsion system for automatically positioning a floating vessel over a desired location and maintaining it over the location.

A further object of this invention is to provide an economical system for positioning a floating marine vessel over a desired location, said system in addition being capable of propelling the vessel from one location to another.

A still further object of this invention is to provide an economical system for positioning a marine vessel that utilizes at least two controllable types of propulsion units in combination with at least one additional propulsion unit. The controllable propulsion units are controlled by a fully or semi-automatic system while the additional propulsion unit is controlled manually to offset the effect of the main forces tending to displace the vessel from its desired position.

A still further object of this invention is to provide an economical system for controlling a marine vessel to maneuver the vessel along a desired course or position utilizing at least two controllable propulsion units and one additional propulsion unit. The controllable propulsion units being fully or semi-automatically controlled while the additional propulsion unit is manually controlled.

The above objects and advantages of this invention are achieved by providing at least two controllable propulsion units for example outboard type units on the floating vessel in combination with at least one additional propulsion unit. A ship control system as for example the system disclosed and claimed in the above-referenced copending application is provided on the vessel for controlling the outboard propulsion units to maintain the position of the vessel. The additional propulsion unit is controlled both as to the magnitude and direction of the thrust to offset the main effect of the forces that tend to displace the vessel from its desired location. Likewise the outboard units can be used to maneuver the vessel along a desired course while the additional propulsion unit supplies the main propulsion effort. Further, while outboard type propulsion units are preferred, other propulsion units could be used providing the units have a means for varying the magnitude of the thrust and direction of the thrust.

The above objects and advantages of this invention will be more easily understood from the following detailed description of a preferred embodiment in which.

Figure 1:
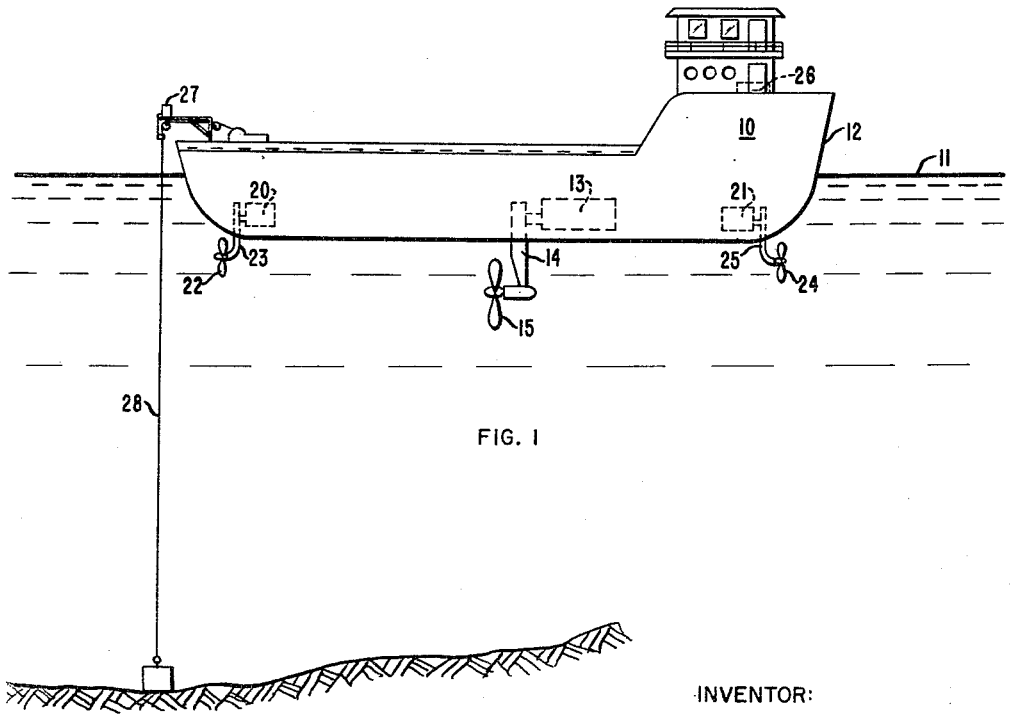
FIGURE 1 is an elevation view of a conventional floating vessel equipped with one embodiment of the positioning system of this invention.

Referring to FIGURE 1, there is shown a vessel 10 floating on the surface of a body of water 11. The vessel 10 is a conventional marine vessel having a bow 12 that is normally headed into the sea if the vessel is anchored, as for example when the vessel is used for a platform for an offshore drilling rig. Similarly, the vessel has the conventional longitudinal and athwartships axis and a fixed center about which it rotates. In the above-referenced copending application such a vessel is shown and includes two outboard propulsion means that are located at the bow and stern, respectively. In FIGURE 1 these outboard propulsion means are shown at 20 and 21, respectively. The outboard 20 is provided with a leg 23 that extends below the bottom of the vessel 10 and is provided with a propeller 22. Similarly, the outboard 21 is provided with a vertical leg 25 having propeller 24 at the lower end thereof. In addition, the propulsion units 20 and 21 are designed to permit rotation of the vertical legs 23 and 25 through 360 degrees to permit directing the thrust of the propeller in any desired direction.

The two propulsion means 20 and 21 are coupled to a control system 26 shown in block form in FIGURE 1. The position of the vessel 10 with respect to its desired position is determined by a tiltmeter 27 that determines the angular deflection of a taut line 28. The taut line 28 is anchored in a position bearing a known relationship to the desired position of the vessel 10. The control system is preferably of the same type as shown and described in the above-referenced copending application. This control system utilizes the position of the vessel 10 as determined by the tiltmeter 27 with respect to a desired position or course, and then directs the propulsion units 20 and 21 in a direction and controls the magnitude of their thrust to return the vessel to its desired position or to maintain the vessel in the desired position against the forces tending to offset it. As explained above, this control system is capable of positioning any size vessel by increasing the size or number of the outboard propulsion units. While it is possible to increase the size of these outboard propulsion units their cost goes up proportionately with the increase in their power ratings.

Accordingly, this invention is directed to the use of relatively small outboard units 20 and 21 and a single large propulsion unit 13. The single large propulsion unit 13 is also of the outboard type having a vertical leg 14 and a propeller 15 disposed at its lower end. While the propulsion unit 13 is of the outboard type it is provided with a minimum of equipment for controlling the direction of thrust or the magnitude of thrust.

While a tiltmeter is described above for determining the position of the vessel other methods may also be used. For example various electronic devices may be used as for example Shoran or radar. In addition, various methods may be used to maneuver the vessel along a desired course using the ship control system 26.

Figure 2:
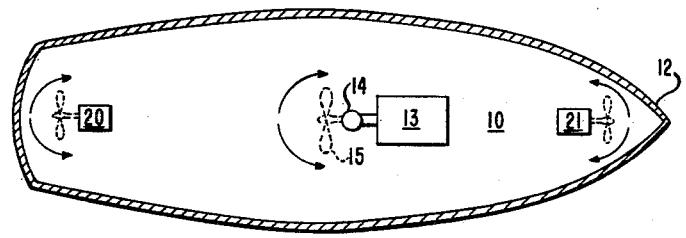
FIGURE 2 is a horizontal section taken along line 1—1 of FIGURE 1 and showing the location of the various propulsion means on the vessel.

The purpose of the large propulsion unit 13 is to overcome or counteract the predominate force that tends to offset or move the vessel 10 from its desired position. This force may be the result of wave or sea action, current or other somewhat constant offsetting forces. Likewise, the offsetting course could be due to the drilling operations being conducted from the vessel. Of course, no drilling structure is shown in FIGURES 1 and 2 but this is of conventional design well known to those skilled in the art and could be incorporated on the vessel 10. Also the propulsion means 13 could be used to supply the main propulsion force for moving the vessel 10 from one location to another. The propulsion means 13 is provided with a means for manually changing the direction of its thrust and the magnitude of its thrust. It may be desirable in some case to provide indications of the magnitude and direction of the thrust supplied by the propulsion means 13. The term manually changing as used in the above description of the propulsion means 13 includes both direct manual means and power assisted manual means such as hydraulic or electric. Even though the controls may be power assisted they are relatively simple and involve no complicated systems for accurately positioning the direction of thrust or adjusting the magnitude of the thrust. Also the controls are not coupled to the ship control system or controlled by the control system. After the propulsion means 13 is positioned to overcome the predominate forces tending to displace the vessel 10 the ship control system can position and control the thrust of the two propulsion means 20 and 21 to maintain the vessel over the desired position. The above results can be obtained at a much lower cost than if one attempted to build the two propulsion units 20 and 21 of sufficient size to both position the vessel and overcome the predominate forces tending to displace the vessel. This can be easily appreciated when one realizes that the main drive motors are normally expensive electrical motors that permit ready adjustment of their speed of rotation. In contrast, the propulsion means 13 may be driven by internal combustion or other types of prime movers since it does not require a fine speed control. Similarly, the means used for rotating the outboard drive 14 may be relatively slow in acting since large rapid adjustment of the direction of thrust will not be required of the propulsion unit 13. Thus, the overall cost of the positioning system may be considerably reduced while simplifying the control system.

Figure 4:
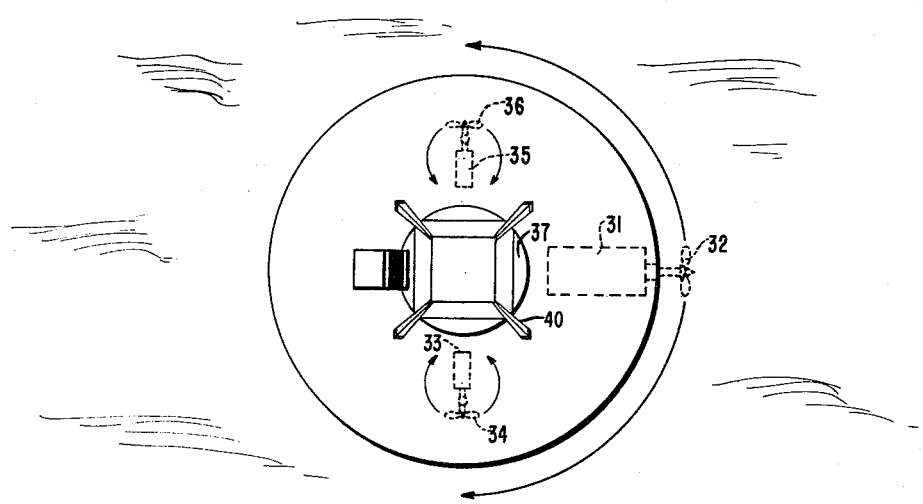
FIGURE 4 is a vertical view of the drilling barge shown in FIGURE 3.
Figure 3:
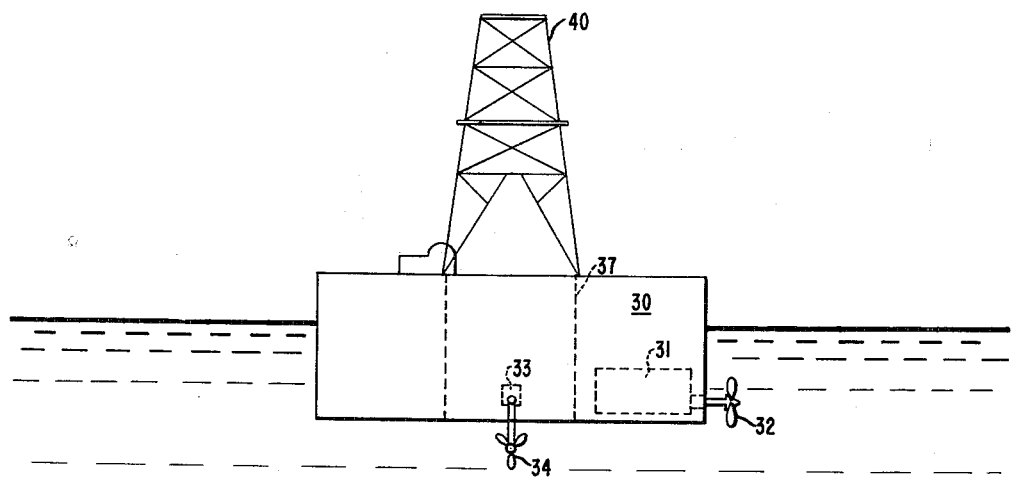
FIGURE 3 is an elevation view of a floating drilling barge showing the second embodiment of the positioning means of this invention.

Referring now to FIGURES 3 and 4 there is shown a drilling vessel 30 having a circular shape with the drilling rig 40 positioned over a central opening 37. The vessel 30 is of the type that need not be oriented with respect to the sea. Furthermore, the vessel 30 has no particular axis as does the vessel shown in FIGURES 1 and 2. Thus, the only requirement for the vessel 30 is that it be maintained over the submerged wellhead without regard to the particular orientation of the vessel. The vessel 30 is provided with a large fixed propulsion unit 31 driving a propeller 32. The propulsion unit is fixed as to the direction of its thrust and only the magnitude of the thrust may be varied. The vessel is also provided with two outboard type propulsion units 33 and 35 that are provided with submerged propellers 34 and 36, respectively. These outboard propulsion units are the same type as shown above in FIGURES 1 and 2. The two outboard propulsion units are controlled by a vessel positioning system such as described in the above-referenced copending application.

The vessel shown in FIGURES 3 and 4 is positioned by aligning or orienting the vessel with the axis of the propulsion unit 31 coinciding with the direction of the predominate force that is tending to displace the vessel from its desired position. In addition for the most economical first cost the vessel can be aligned so that the propulsion unit 31 need be operated in one direction only and thus eliminate the need for machinery for reversing the rotation of the propeller 32. The outboard propulsion units 33 and 35 are then controlled by the vessel positioning system to compensate for slight movements of the vessel off its desired location. As explained above with respect to FIGURES 1 and 2 the use of a single large propulsion unit having limited flexibility in combination with a plurality of small outboard type propulsion units results in a more economical vessel positioning system. In the case of the vessel shown in FIGURES 3 and 4 the large propulsion unit is provided only with a means for varying the magnitude of its thrust and does not include any means for varying its direction of thrust with respect to the vessel. Since the vessel 30 has no preferential heading with respect to the sea for stability reasons, it is practical to vary the heading of the vessel to direct the thrust of the propulsion means. The two outboard propulsion units 33 and 35 are used to maintain the desired direction of major thrust, and thus the heading of the vessel. The two outboard propulsion units 33 and 35 can also easily maintain the vessel over the desired position since the large propulsion unit 31 will compensate for the predominate force tending to displace the vessel from the desired position.

While this invention has been described with respect to both a conventional vessel and a drilling vessel that has no preferential axis or orientation it can be adapted to other vessels. For example, it could easily be adapted to those drilling vessels that are supported by a grid type framework having individual flotation or buoyancy members. These vessels have similar characteristics to the vessel shown in FIGURES 3 and 4, i.e., they do not require any particular orientation with the sea or waves. Even though these vessels do not require any particular orientation, they are displaced by the predominate force due to wind, current, waves and drilling conditions and thus some means must be included to maintain them over the desired position. Likewise, other propulsion means than the outboard type could be used. For example, jet type propulsion units or vertical axis propellers could be used. Accordingly, this invention should not be limited to the details described but only to its broad spirit and scope as set forth in the appended claims.

I claim as my invention:

1. In a vessel positioning system the combination comprising:
    at least two propulsion units disposed on said vessel, said propulsion units having means for varying the direction and magnitude of their thrust, said propulsion units in addition being mounted on opposite sides of the turning center of said vessel;
    a position detecting means mounted on the vessel for determining the position of the vessel with respect to the desired position of the vessel;
    a vessel control system disposed on said vessel, said control system being coupled to said position detecting means and said two propulsion units to maneuver said propulsion units in response to said position detecting means;
    at least one additional propulsion unit disposed on said vessel, said additional propulsion unit having a means for varying the magnitude and direction of thrust;

and means coupled to said additional propulsion unit for controlling said additional propulsion unit to counteract the main force tending to displace the vessel from the desired position.

2. The vessel position system of claim 1 in which the vessel is a conventional vessel having a longitudinal and athwartship axis, the two propulsion units are mounted along the longitudinal axis of the vessel adjacent the bow and stern of the vessel, and the additional propulsion unit being mounted on the longitudinal axis of the vessel between said two propulsion units.

3. The vessel positioning system of claim 1 in which the vessel is of the type that has no particular axis, the two propulsion units being mounted on the periphery of the vessel and said additional propulsion unit is mounted on the periphery of the vessel, said additional propulsion unit being fixed and having only a means for varying the magnitude of the thrust.

4. In a vessel positioning system the combination comprising:

at least two propulsion means having controllable thrust and direction of thrust, said propulsion means being positioned on the vessel to generate both a turning couple and a displacement force;

a position detecting means mounted on the vessel for determining the position of the vessel and the heading of the vessel with respect to the desired position and heading of the vessel;

a vessel control system, said vessel control system being coupled to said position detecting means and said propulsion units to maneuver said propulsion units to maintain the desired position and heading of the vessel;

at least one additional propulsion unit disposed on said vessel, said additional propulsion unit having means for varying the magnitude and direction of thrust;

and means coupled to said additional propulsion unit for controlling said additional propulsion unit to counteract the main force tending to displace the vessel from its desired position.

5. The position system of claim 4 wherein the vessel control system is automatic in operation and the additional propulsion system is controlled in response to a manual imput.

References Cited by the Examiner

UNITED STATES PATENTS

| | | | |
|---|---|---|---|
| 2,735,393 | 2/56 | White | 114—147 |
| 3,105,453 | 10/63 | Hayes | 114—144 |

MILTON BUCHLER, *Primary Examiner.*

ANDREW H. FARRELL, *Examiner.*